US008267116B2

(12) United States Patent  
Huber et al.

(10) Patent No.: US 8,267,116 B2  
(45) Date of Patent: Sep. 18, 2012

(54) STRAINER AND ANTI-BACKFLOW DEVICE FOR COMPRESSORS

(75) Inventors: Paul A. Huber, Boones Mill, VA (US); Paul Nemit, Jr., Roanoke, VA (US)

(73) Assignee: Johnson Controls Technology Company, Holland, MI (US)

( * ) Notice: Subject to any disclaimer, the term of this patent is extended or adjusted under 35 U.S.C. 154(b) by 1616 days.

(21) Appl. No.: 11/461,079

(22) Filed: Jul. 31, 2006

(65) Prior Publication Data

US 2008/0023081 A1    Jan. 31, 2008

(51) Int. Cl.  
*F16K 15/06* (2006.01)

(52) U.S. Cl. .............. 137/516.17; 137/544; 137/625.37; 137/528

(58) Field of Classification Search .................. 137/547, 137/550, 544, 549, 528, 511, 516.19, 516.17, 137/625.33, 625.37, 533.21, 533.27, 533.29  
See application file for complete search history.

(56) References Cited

U.S. PATENT DOCUMENTS

| | | | | |
|---|---|---|---|---|
| 613,681 | A | * | 11/1898 | Hoyt ............................ 137/248 |
| 1,326,923 | A | * | 1/1920 | Frech ....................... 137/516.17 |
| 2,097,216 | A | * | 10/1937 | Schreurs ...................... 48/189.6 |
| 2,202,211 | A | * | 5/1940 | Kling ............................ 137/513 |
| 2,598,131 | A | | 5/1952 | O'Donnell |
| 2,667,891 | A | | 2/1954 | Hilldale |
| 3,164,168 | A | | 1/1965 | Bradley |
| 3,456,682 | A | * | 7/1969 | Blackford ................ 137/516.17 |
| 3,473,561 | A | * | 10/1969 | Svenson et al. ............... 137/854 |
| 3,698,411 | A | | 10/1972 | Garrett |
| 3,916,947 | A | | 11/1975 | Holmes et al. |
| 4,088,149 | A | | 5/1978 | Logsdon |
| 4,103,705 | A | | 8/1978 | Wagner et al. |
| 4,227,380 | A | | 10/1980 | Laucks et al. |
| 4,276,163 | A | | 6/1981 | Gordon |
| 4,365,648 | A | | 12/1982 | Grothe |
| 4,483,363 | A | * | 11/1984 | Madoche et al. ........ 137/329.04 |
| 4,685,310 | A | | 8/1987 | Stegmann et al. |
| 5,717,137 | A | * | 2/1998 | Singleterry et al. ............ 73/239 |
| 5,860,449 | A | * | 1/1999 | Schulte .......................... 137/550 |
| 5,879,456 | A | | 3/1999 | Curran |
| 5,911,828 | A | | 6/1999 | Curran |
| 6,105,609 | A | * | 8/2000 | Polidan et al. .............. 137/515.7 |
| 6,220,839 | B1 | * | 4/2001 | Sheridan et al. ............. 418/55.1 |
| 6,488,049 | B2 | * | 12/2002 | Sims ........................ 137/543.15 |
| 6,805,160 | B1 | * | 10/2004 | Keichler ....................... 137/590 |

* cited by examiner

*Primary Examiner* — Craig Schneider  
*Assistant Examiner* — Andrew J Rost  
(74) *Attorney, Agent, or Firm* — McNees Wallace & Nurick LLC

(57) ABSTRACT

A backflow and strainer device is presented. The device is a unitary unit that prevents backflow of fluid gas in a compressor and prevents dirt particles and debris from entering the compressor, thereby damaging the components. A valve mechanism moves between an open position and a closed position to either allow or prevent fluid gas from flowing into the compressor. A mesh portion is disposed in the device to trap all dirt particles and debris to prevent them from entering the compressor. The valve mechanism responds to the higher and lower pressures associated with the operation and shutdown of compressors.

14 Claims, 11 Drawing Sheets

STRAINER AND ANTI-BACKFLOW DEVICE FOR COMPRESSORS

FIELD OF THE INVENTION

The present invention is directed generally to a valve arrangement for screw compressors. Specifically, the present invention is directed to a strainer and anti-backflow device at the suction inlet of a screw compressor.

BACKGROUND OF THE INVENTION

Rotary screw compressors use two lobed rotating and closely meshing rotors that alternatively draw gas fluid into the mesh. The gas fluid is then compressed, and expelled through a discharge opening at a higher-pressure level. A differential pressure is developed across the compressor such that when the compressor shuts down, gas can flow back through the compressor if the gas flow is not restricted in some way. This backflow is not usually desirable and as such, devices such as check valves are placed in the suction or discharge line of the compressor to prevent this backflow of gas from occurring at shutdown. However, these check valve devices can be very expensive and bulky. Backflow in a screw compressor produces undesirable high rotor speeds, where in some cases maximum bearing speeds of the rotor are exceeded. The excessive speeds cause loud noise levels that are not only annoying and unnecessary, but are unacceptable in many situations.

In addition to preventing the backflow in the compressor, in rotary screw compressors it is necessary and favorable to protect the sensitive internal components from system dirt by providing a fine mesh strainer in the compressor's suction line. To accommodate the protection of the components, the strainer must be placed in the casting/suction piping for the compressor.

Thus, what is needed is one device that can prevent backflow of gas fluid and protect the compressor components from system dirt debris while having a reduced size compared to the traditional expensive, bulky systems.

SUMMARY OF THE INVENTION

An anti-backflow system for a compressor includes a hollow, cylindrical body, a flanged ring connected to an end of the cylindrical body and extending from the cylindrical body for attachment to the compressor, and a valve mechanism disposed adjacent the cylindrical body and configured and disposed to have a first position to prevent fluid flow through the cylindrical body and a second position to permit fluid flow through the cylindrical body. The system also includes a stop configured to limit the valve mechanism to movement between the first position and the second position and a strainer mechanism disposed adjacent the cylindrical body and configured to trap dirt particles and debris to prevent the dirt particles and debris from passing through the cylindrical body. The valve mechanism moves between the first position and second position in response to the direction of fluid entering the cylindrical body.

A compressor system includes a housing having an inlet connection and an outlet connection, a compression device disposed in the housing and configured to increase a pressure of a fluid flowing between the inlet connection and the outlet connection, and a flow control device disposed adjacent the inlet connection. The flow control device includes a hollow, cylindrical body, a flanged ring connected to an end of the cylindrical body and extending from the cylindrical body and connected to the inlet connection, and a valve mechanism configured and disposed to have a first position to prevent fluid flow through the cylindrical body and a second position to permit fluid flow through the cylindrical body. The flow control device also includes a strainer device disposed adjacent to cylindrical body and configured to trap dirt particles and debris to prevent the dirt particles and debris from passing through the strainer device. The flow control device prevents the backflow of fluid through the housing by having the valve mechanism move to the first position when the compression device is shut down.

A valve system for a compressor includes a hollow, cylindrical body, a flanged ring connected to an end of the cylindrical body and extending from the cylindrical body, and a conical portion having a plurality of openings and being configured with a larger diameter end and a smaller diameter end. The system also includes a conical poppet disposed adjacent to the conical portion and configured to move between a first position to permit flow through the cylindrical body and a second position to prevent flow through the cylindrical body and a stop being configured to limit the conical poppet to movement between the first position and the second position. Further, the system includes a slide stem extending from the smaller diameter end of the conical portion toward the larger diameter end of the conical portion and a strainer disposed adjacent to the conical portion and being configured to trap dirt particles and debris to prevent the dirt particles and debris from passing through the cylindrical body. The conical poppet moves along the slide stem between the first position and second position in response to the direction of fluid entering the cylindrical body.

A valve system for a compressor includes a hollow, cylindrical body, a flanged ring connected to an end of the cylindrical body and extending from the cylindrical body, a disk configured and disposed to rotate between a first position to permit flow through the cylindrical body and a second position to prevent flow through the cylindrical body, and an eccentric mounting to enable rotation of the disk from the first position to the second position. The system also includes a stopping arrangement comprising at least one ridge located around an inner edge of the flanged ring, and being configured to limit the disk to movement between the first position and the second position and a straining device disposed adjacent the cylindrical body and being configured to trap dirt particles and debris to prevent the dirt particles and debris from passing through the cylindrical body. The disk moves between the first position and second position in response to the direction of fluid entering the cylindrical body.

One advantage of the present invention is a reduced cost of manufacturing and assembly of the device.

Another advantage of the present invention is the elimination of the requirement of separate housings for a strainer and a check valve in the compressor.

Yet another advantage of the present invention is the elimination of the need for a spring or other mechanism to open or close a valve, which simplifies the design and further eliminates costs.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

The present invention is directed to a device for preventing backflow of gas fluid in a compressor, preferably a screw compressor, while further protecting the compressor components from particles and debris. The device incorporates into one unitary device a check valve that prevents backflow of gas fluid in the compressor after shutdown and a strainer that prevents debris from entering the compressor and damaging the components therein.

Figure 1:
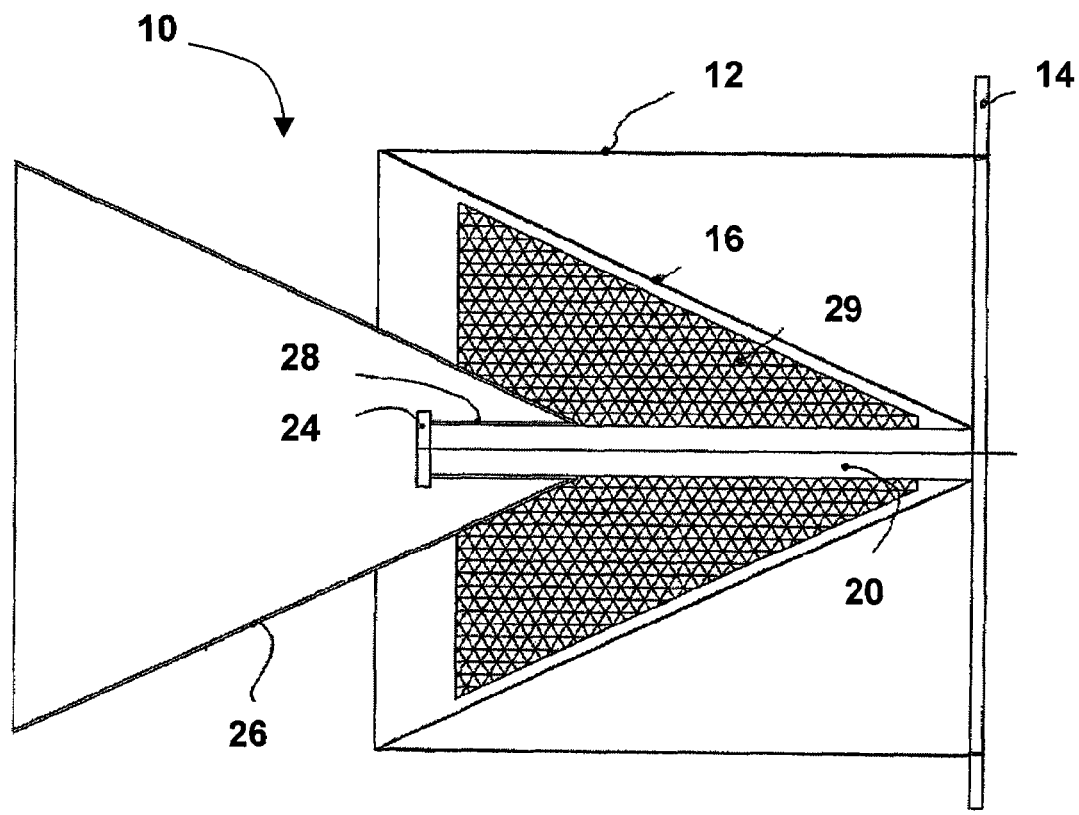
FIG. 1 illustrates one embodiment of the valve arrangement of the present invention.

Referring to FIG. 1, one embodiment of the strainer and anti-backflow device 10 includes a tube or cylinder 12 that is connected to a flanged ring 14. A slotted conical portion 16 is disposed inside the tube 12. It is to be understood that the slots or openings in the conical portion 16 are windows cut in any shape or size suitable to maximize the flow area and maintain a structural integrity to resist the pressure difference to which the device is subjected to when the compressor is shut down. A larger diameter end 18 of the conical portion 16 is facing the end of the tube 12 opposite the flanged ring 14. A slide stem 20 is secured to the smaller diameter end 22 of the conical portion 16, which faces the flanged ring 14, and is substantially centered in the tube 12. The end of the slide stem 20 opposite the flanged ring 14 terminates in a stop 24. A conical poppet 26 has a tube portion 28 that is sized with respect to the slide stem 20 to permit the poppet 26 to slide along the slide stem 20 between the stop 24 (open position) and the small diameter end 22 (closed position). The stop 24 prevents the poppet 26 from sliding off the slide stem 20 and separating from the rest of the tube 12 and the remainder of the device 10. Further, a mesh or screw portion 29 is disposed between the conical portion 16 and the poppet 26. The mesh portion 29 can be secured by brazing, soldering, or other similar connecting or fastening technique. In addition, the mesh portion 29 can be integrated into one assembly with the conical portion 16. The mesh portion 29 acts as a filter or strainer for the dirt particles and debris that are associated with the fluid gas and prevents the dirt particles and debris from entering the rotors of the compressor to protect them from damage. The mesh portion 29 is constructed of a compressible material, preferably a steel wire mesh, suitable to enable the mesh portion 29 to compress when the poppet 26 is in the closed position.

Figure 2:
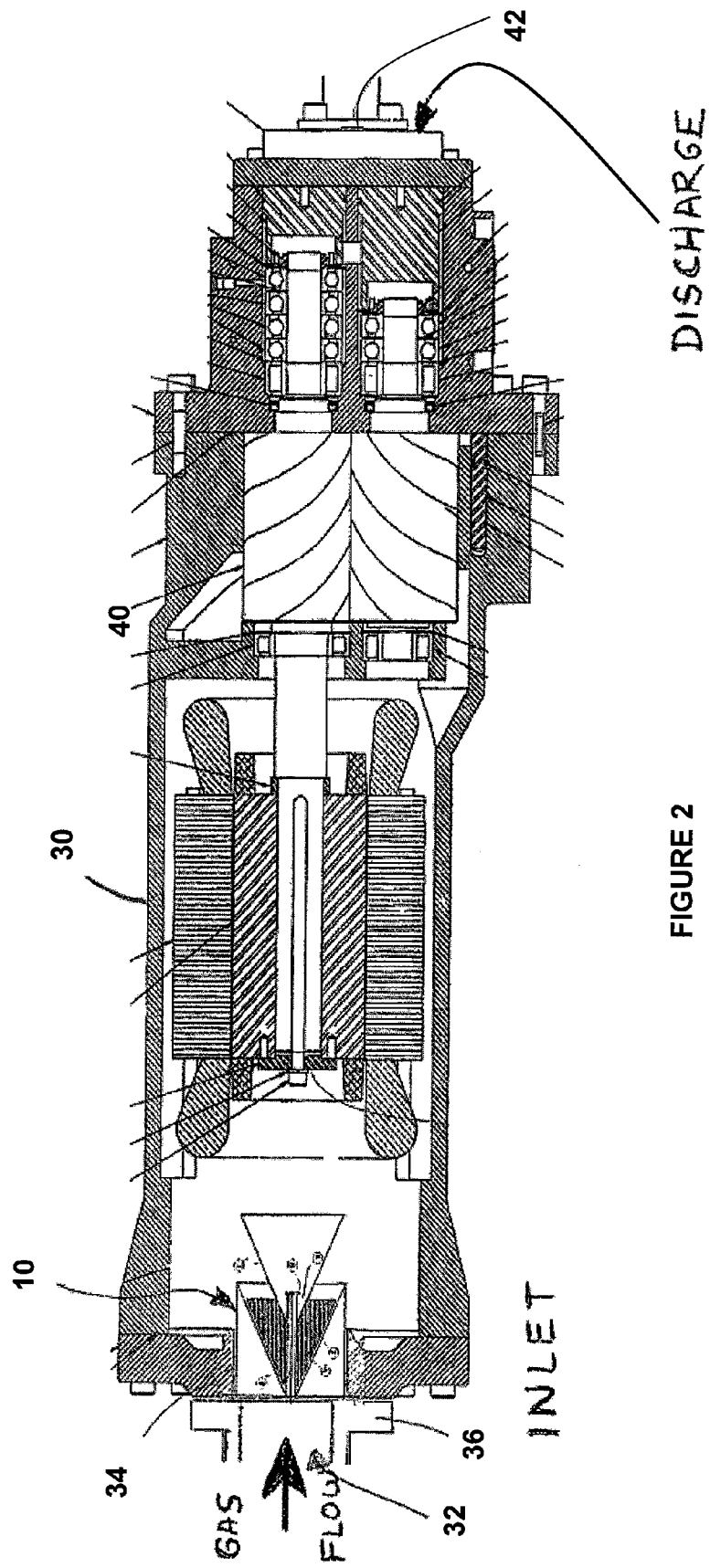
FIG. 2 illustrates one embodiment of the valve arrangement of the present invention within the compressor suction opening.

As shown in FIG. 2, the strainer and backflow device (hereinafter called "device") 10 is inserted inside the compressor housing 30 with the tube 12 of the device 10 extending inside the screw compressor housing 30. The device 10 is secured along the inlet 32 of the screw compressor between the inlet flange 34 of the screw compressor and the flange of the plumbing 36 that is connected to the inlet flange 34 of the housing 30.

Figure 3:
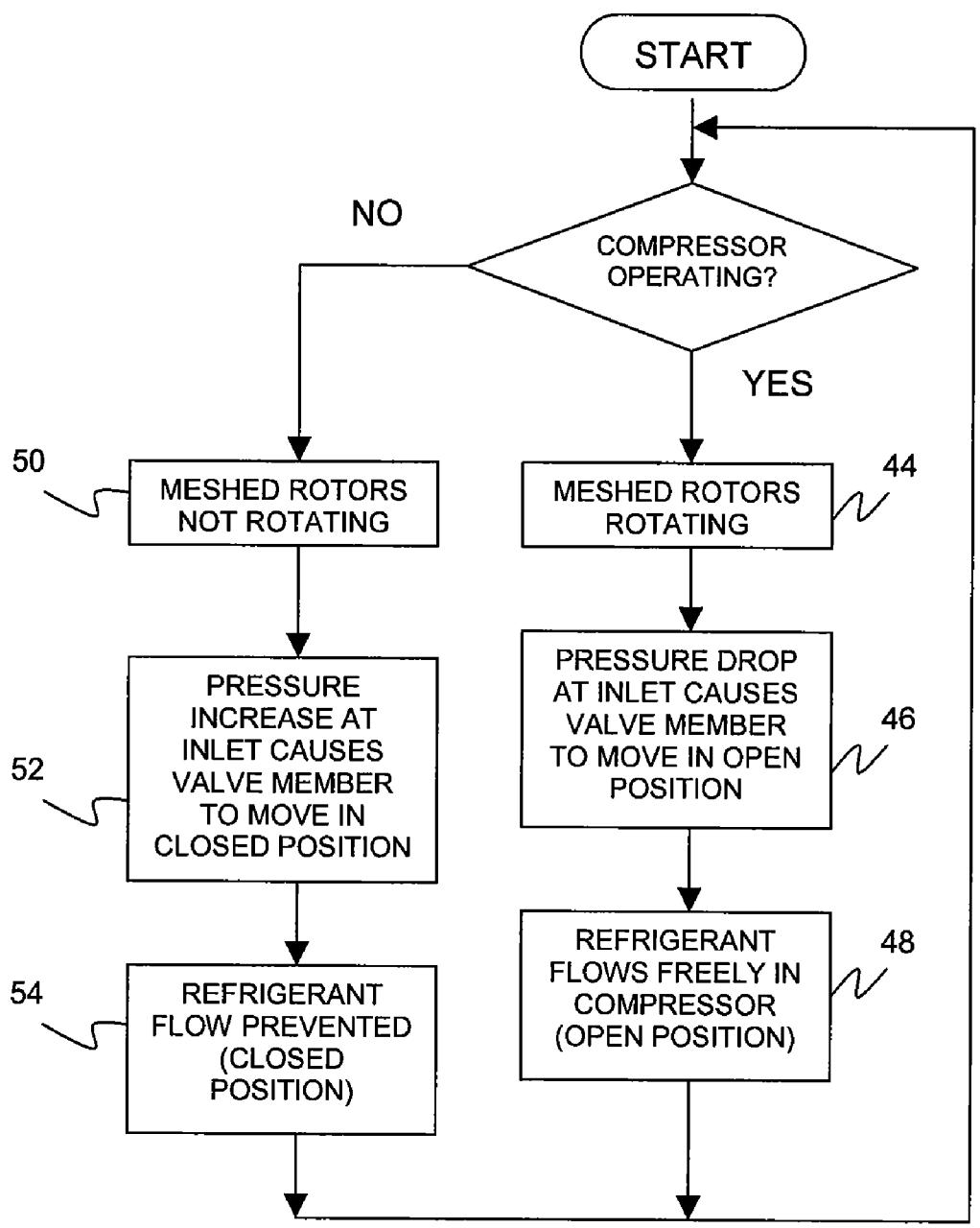
FIG. 3 is a diagram of the operational process of the valve arrangement of the present invention.

Referring now to FIG. 3, when the screw compressor is operating, the rotating pair of meshed rotors 40 (See FIG. 2) creates a pressure drop and corresponding fluid flow at the inlet 32 of the screw compressor in Step 44 which causes the valve member or poppet 26 of the device 10 to slide along the slide stem 20 to an open position in Step 46, permitting refrigerant to enter the compressor housing inlet 32 in Step 48. When the screw compressor is not operating, the pair of meshed rotors 40 are not rotating in Step 50. In Step 52, pressurized refrigerant adjacent the compressor outlet 42 (See FIG. 2) that had been compressed by the meshed rotors 40 begins to flow backward or in the opposite direction within the compressor housing 30 toward the inlet 32 of the compressor housing 30 due to the inlet 32 having a lower pressure level. The reverse flow of the refrigerant flowing around the larger diameter end 18 of the poppet 26 causes the valve member or poppet 26 to move along the slide stem 20 to a closed position in Step 54, without the need for a spring or other device, thus preventing the further reverse flow of refrigerant through the compressor housing 30. Resumed operation of the screw compressor 38 causes the poppet 26 to return to the open position as previously described in Step 46.

Figure 4:
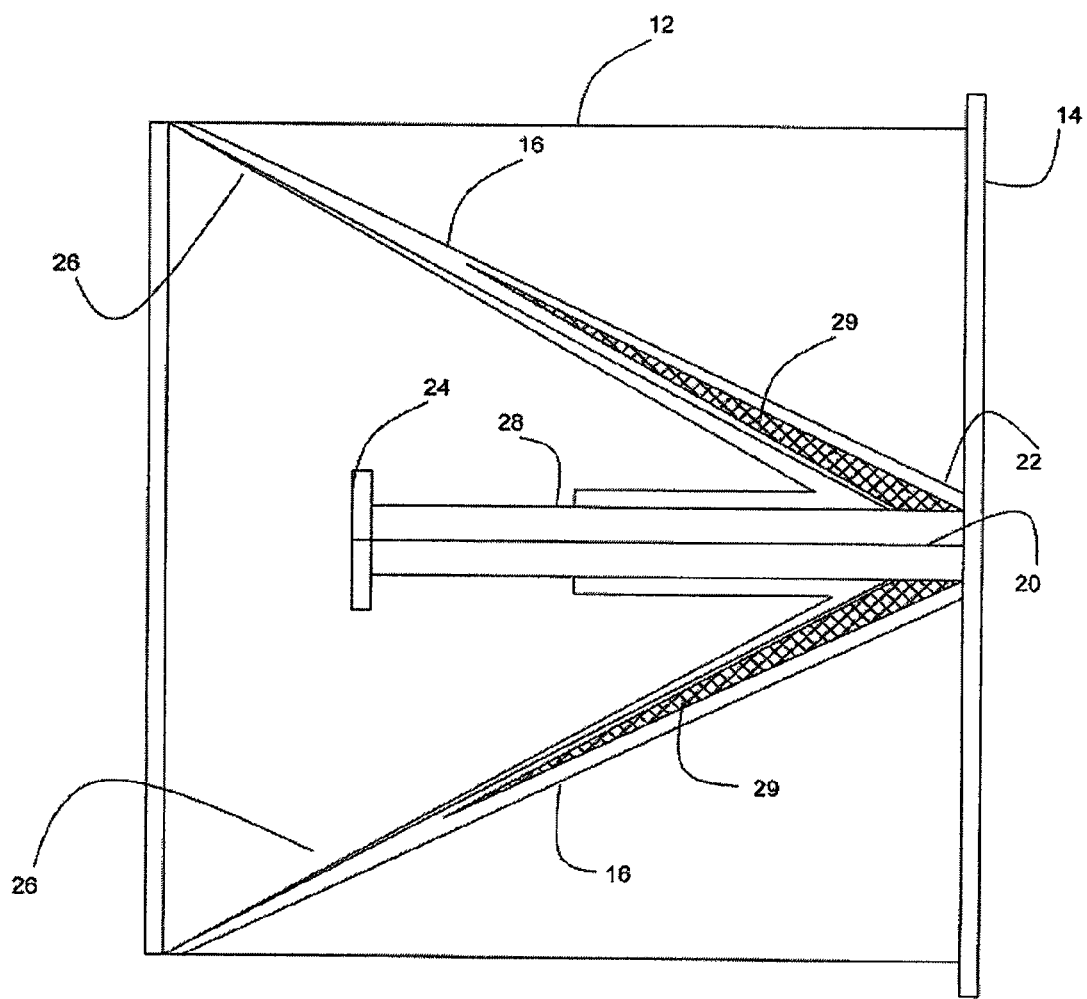
FIG. 4 illustrates the poppet of one embodiment of the valve arrangement of the present invention in the closed position.

Referring now to FIG. 4, when the poppet 26 is in the closed position, the poppet 26 slides along the slide stem 20 by way of the tube portion 28 toward the flanged ring 14, thereby sealing the conical portion 16 allowing substantially no refrigerant to flow through the device 10. The mesh portion 29 traps dirt, debris and other impurities, and requires periodic cleaning to remove the trapped impurities. Without the periodic cleaning, the trapped dirt may clog the mesh portion and prevent the free flow of fluid through the device.

Figure 5:
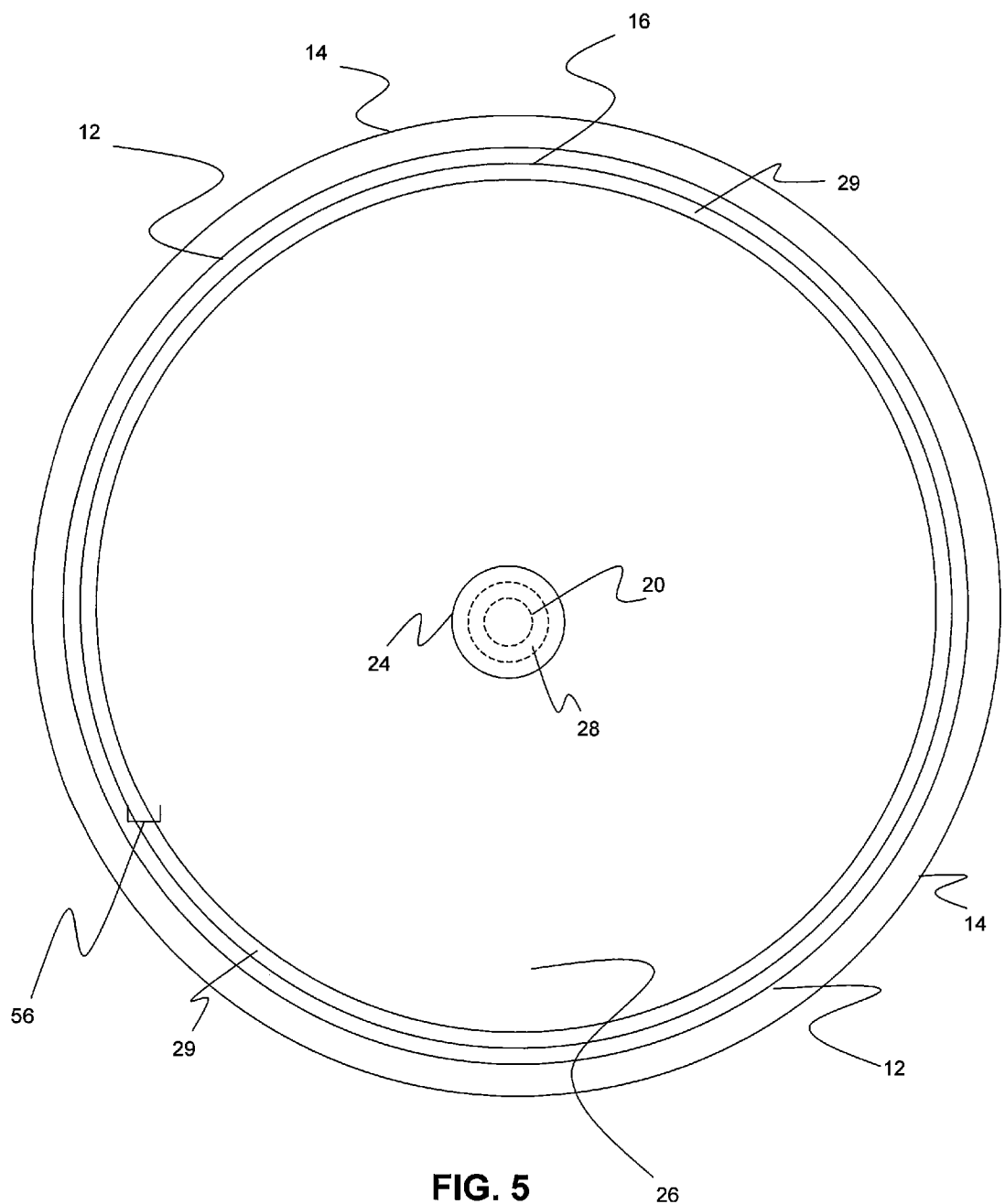
FIG. 5 is a back view of one embodiment of the valve arrangement of the present invention.

Referring now to FIG. 5, the poppet 26 is disposed on the side of the conical portion 16 opposite the flanged ring 14. The end of the poppet 26 with the smaller diameter is attached to the tube portion 28. The larger diameter end 22 of the conical portion 16 is attached to the cylindrical tube 12 (See FIG. 4). When the poppet 26 is in the open position, the fluid gas flows through the space 56 between the conical portion 16 and the poppet 26 where the mesh portion 29 is disposed. When the compressor shuts down, the poppet 26 is drawn toward the flanged ring 14 by sliding on the slide stem 20. The poppet 26 seals off the space 56 between the conical portion 16 and the poppet 26. This prevents the fluid gas from flowing into the compressor and protects the compressor components.

While the device is suitable for any compressor, more specifically, the device is suitable for a compressor in a refrigeration system. The device is used in a refrigeration system to control the fluid flow through the system. When the poppet 26 is in the open position (see FIG. 1), the refrigerant fluid flows freely through the refrigeration system, with the mesh portion 29 trapping any dirt, debris or other impurities in the fluid. When the poppet 26 is in the closed position (see FIG. 4), the refrigerant fluid would be prevented from flowing freely through the system, and the system is shut down. The present invention prevents backflow of the refrigerant fluid into the compressor 38 (see FIG. 1). The prevention of backflow in the rotors ensures that the rotor operates at normal speeds, thereby preserving the reliability and longevity of the compressor. In addition, the prevention of backflow also helps to reduce noise levels when the compressor is turned off.

Figure 6:
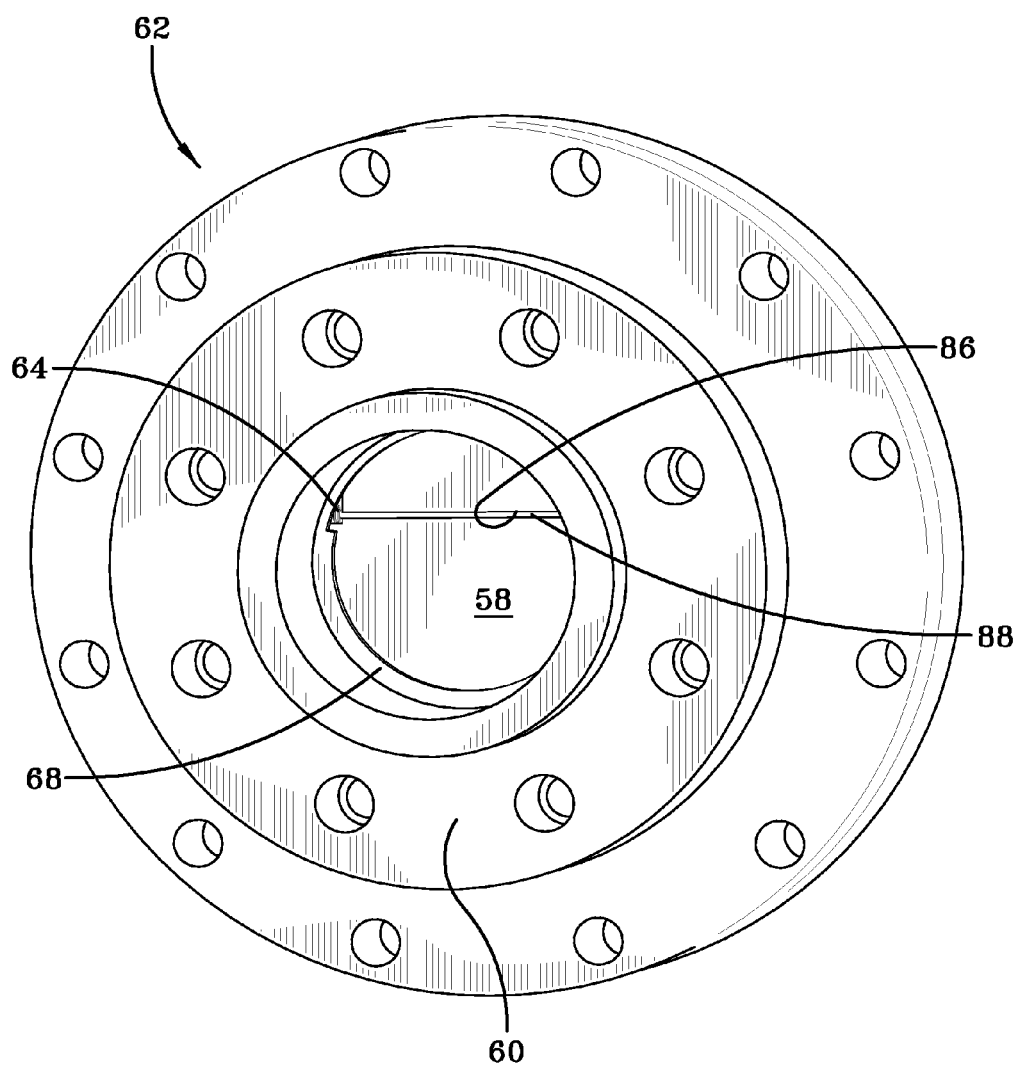
FIG. 6 illustrates an alternate embodiment of the valve arrangement of the present invention.
Figure 7:
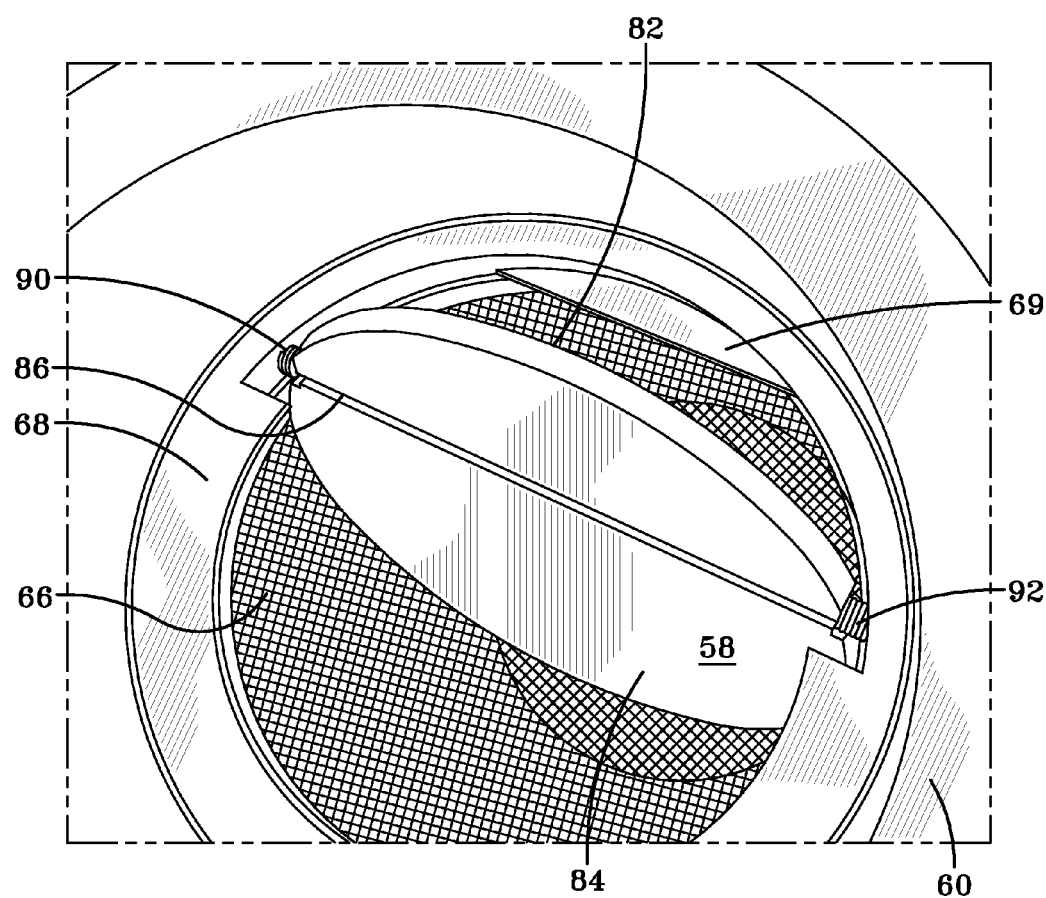
FIG. 7 illustrates an alternate embodiment of the valve arrangement of the present invention in an open position.

FIG. 6 shows an alternate configuration of the strainer and back flow device of the present invention, which includes a device with a disk member 58 disposed in the flange ring 60 of the strainer 66 (See FIG. 7). This embodiment eliminates a separate housing for the check valve and has a benefit of low cost manufacturing. Referring back to FIG. 3, when the screw compressor is operating, the rotating pair of meshed rotors 40 creates a pressure drop at the inlet 32 of the screw compressor in Step 44 which causes the valve member or disk 58 of the device 62 to rotate on an eccentric mounting 64 to an open or first position in Step 46 (see FIG. 7), permitting refrigerant to enter the compressor housing inlet 32 in Step 48. When the screw compressor 38 is not operating, the pair of meshed rotors 40 are not rotating in Step 50. In Step 52, pressurized refrigerant adjacent the compressor outlet 42 that had been compressed by the meshed rotors 40 begins to flow backward or in the opposite direction within the compressor housing 30 toward the inlet 32 of the compressor housing 30 due to the inlet 32 having a lower pressure level. The reverse flow of the refrigerant flowing around the disk 58 causes the disk 58 to rotate on the eccentric mounting 64 to a closed or second position in Step 54, thus preventing the further reverse flow of refrigerant through the compressor housing 30. Resumed operation of the screw compressor causes the disk 58 to return to the open position as previously described in Step 44.

Referring to FIG. 7, when the pressure drop occurs at the inlet 32, the disk 58 rotates on the eccentric mounting shaft 88 into the first position, so that the inlet 32 is open and refrigerant flows freely into the strainer 66. The first position of the disk 58 is such that the disk 58 is substantially perpendicular to the inlet 32. The force of the pressure drop sustains the disk 58 in the first open position. When the system shuts down, the pressure rises, thereby causing the disk 58 to move to the second position, or closed position (shown in FIG. 6). From the first position to the second position, the disk 58 rotates on the eccentric mounting shaft 88 until the disk rests upon or against the stop(s) 68, 69 that is disposed circumferentially inside the inlet 32. The stop(s) 68, 69 prevents the disk 58 from rotating on the shaft 88 to a position other than the closed position when the system is shut down. The stop(s) 68, 69 is a lip or a ridge, or alternatively a plurality of lips or ridges that extend past the opening of the flanged ring 60 and are located on the flanged ring, the cylindrical body, or both. The top portion of the stop 69 is disposed in the flanged ring 60 such that the back 82 of the disk 58 rests upon it when in the second position. The bottom portion of the stop 68 is disposed on the flanged ring 60 such that the front 84 of the disk 58 rests upon it when in the second position. The stop(s) 68, 69 are further disposed on the flanged ring such that the back 82 of the disc 58 rests upon the stop 69 at the same time the front 84 of the disc 58 rests upon the stop 68 when the disk is in the second position. Further, when the disk 58 is in the second position, the disk 58 substantially seals the flanged ring 60 and is substantially parallel with the opening. While the disk 58 is shown in the figures as being round in shape, it is to be understood that the disk 58 could be any shape suitable for the device 62.

The use of an eccentric mounting 64 allows the disk to rotate without a spring mechanism, but requires proper orientation to work. The eccentric mounting 64 is located on the disk 58 at approximately ⅓ of the radius (measured from the center) of the disk 58 or anywhere from between about 1/10 of the radius of the disk 58 to about 9/10 of the radius of the disk to enable the movement of the disk 58 during operation of the compressor. It should further be understood that while the location of the eccentric mounting 64 at approximately ⅓ of the radius of the disk 58 is preferred, the eccentric mounting 64 can be located at any suitable location on the disk 58 that ensures that the disk 58 can rotate as necessary during operation of the compressor, while preventing a continual spinning movement of the disk 58 and eliminating the need for a spring mechanism. The specific location of the eccentric mounting 64 is dependant upon the weight of the parts, including the disk 58, and the actual pressure drop that occurs in the compressor. The greater the distance from the center of the disk 58 that the eccentric mounting 64 is located, the larger the amount of pressure drop is needed to keep the disk 58 in the open or first position. The actual weight of the disk 58 is dependant upon the material used for the disk 58. While it is understood that the disk could be made of any suitable material for the application, the disk may be constructed of metal, plastic or other rigid material. In a preferred embodiment, the eccentric mounting 64 is disposed such that the shaft 88 is substantially horizontal.

Referring back to FIG. 7, the strainer 66 traps dirt, debris and other impurities, and requires periodic cleaning to remove the trapped impurities. The strainer may be a cylinder with a plurality of openings suitable for allowing the refrigeration fluid to pass freely through it with a mesh material secured to the cylinder. The mesh then traps the dirt or debris. In addition the mesh material may be integrated into one assembly with the cylinder. Without the periodic cleaning, the trapped dirt may clog the strainer and prevent the free flow of fluid through the device. In addition, the stop(s) 68, 69 extends out into the opening where the disk 58 rotates freely, and prevents the disk 58 from rotating to positions other than the first position, second position, and any position in between. The eccentric mounting 64 that facilitates the movement of the disk 58 from the first position to the second position is preferably a straight shaft 88 that extends laterally across the disk 58 and eliminates the use of springs. The disk 58 has a groove 86 in which the eccentric mounting shaft 88 is secured. In addition, the shaft 88 of the eccentric mounting 64 has two end attachments 90, 92 that protrude out from the disk 58. Each end attachment 90, 92 secures the disk 58 and shaft 88 to the flanged ring 60 and facilitates the movement of the disk 58 between the first position and the second position. The end attachments 90, 92 each have a point on one end and an indented hex on the other. Both attachments 90, 92 have advancing spiral threads that allow the attachments 90, 92 to securely fasten into the flanged ring 60. The screw-like threads allow for the adjustment of the eccentric mounting to either tighten or loosen the rotation capability of the disk 58 during operation of the device.

Figure 8:
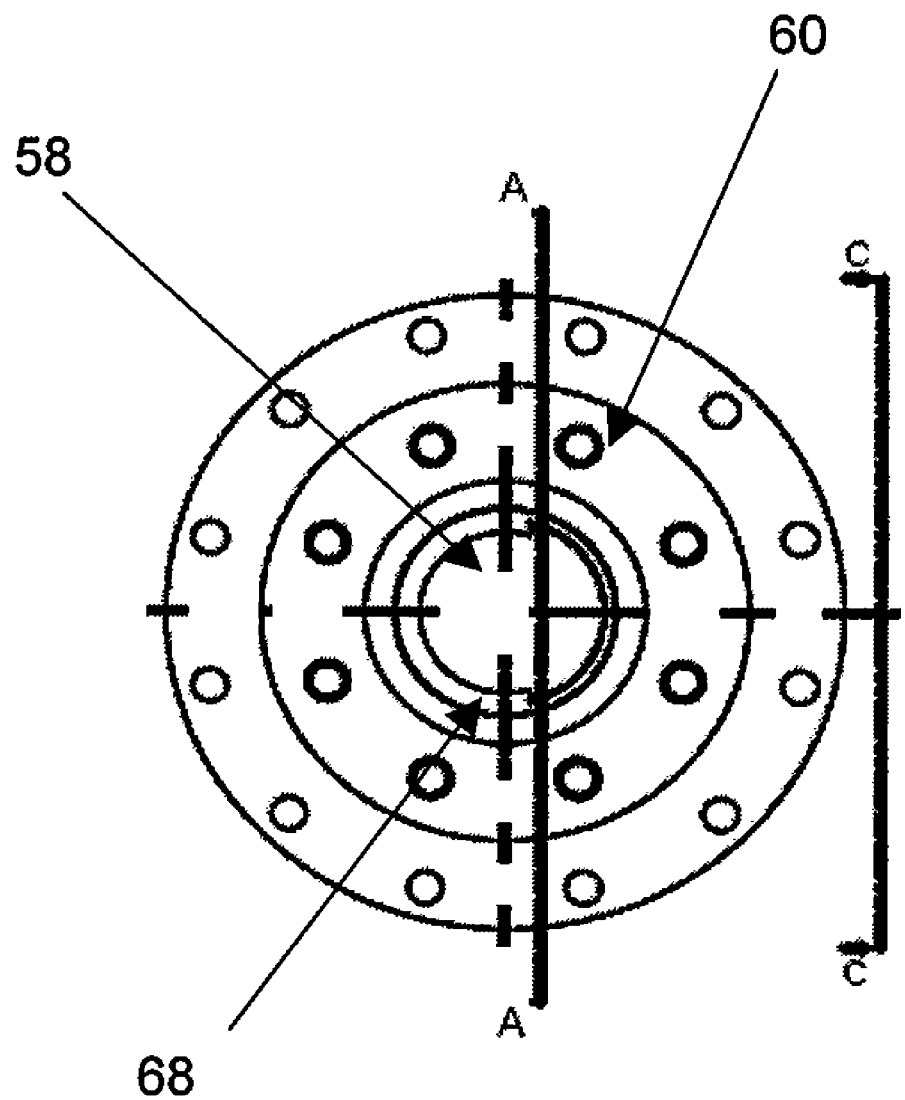
FIG. 8 illustrates a front view of the alternate embodiment of the valve arrangement of the present invention.
Figure 9:
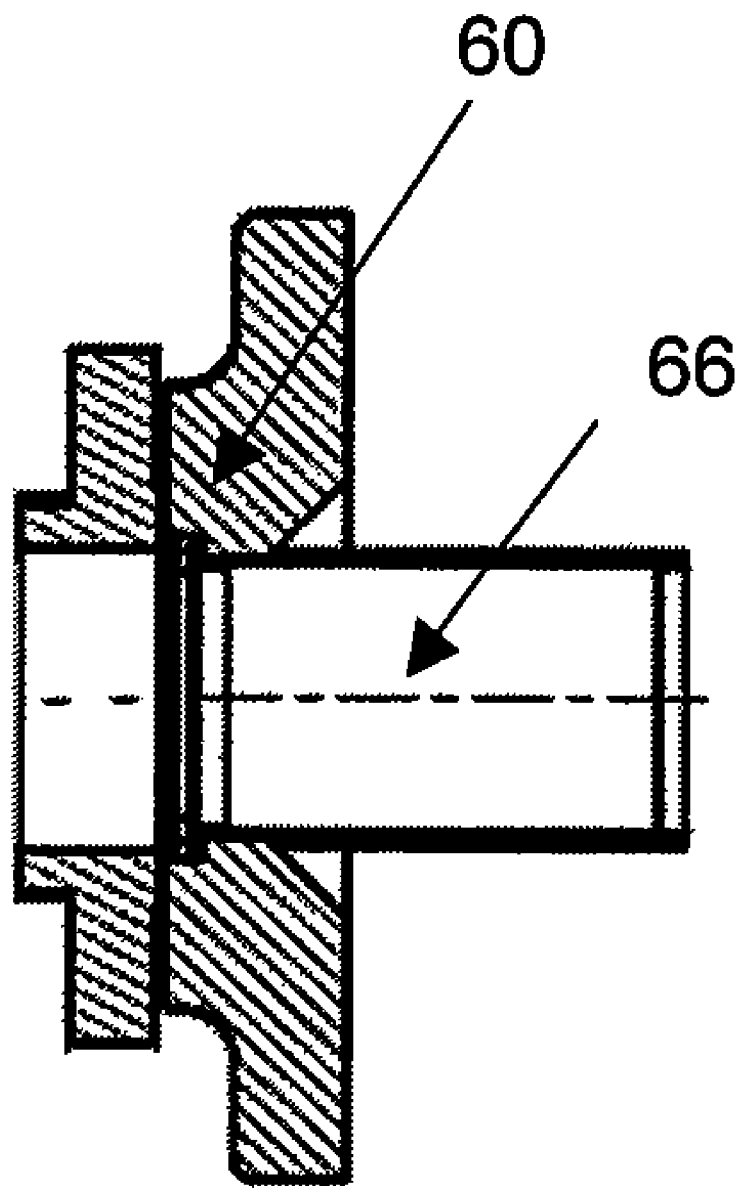
FIG. 9 is a cross sectional view taken along like A-A in FIG. 8.
Figure 10:
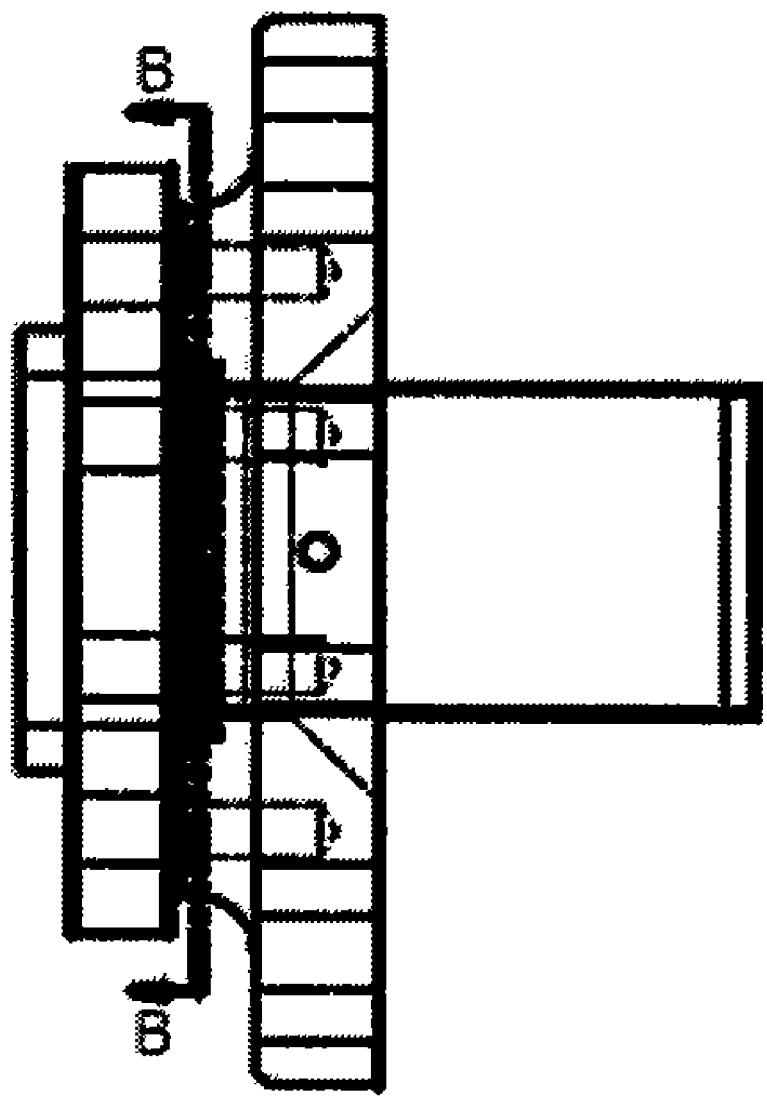
FIG. 10 is a side view taken along like C-C in FIG. 8.
Figure 11:
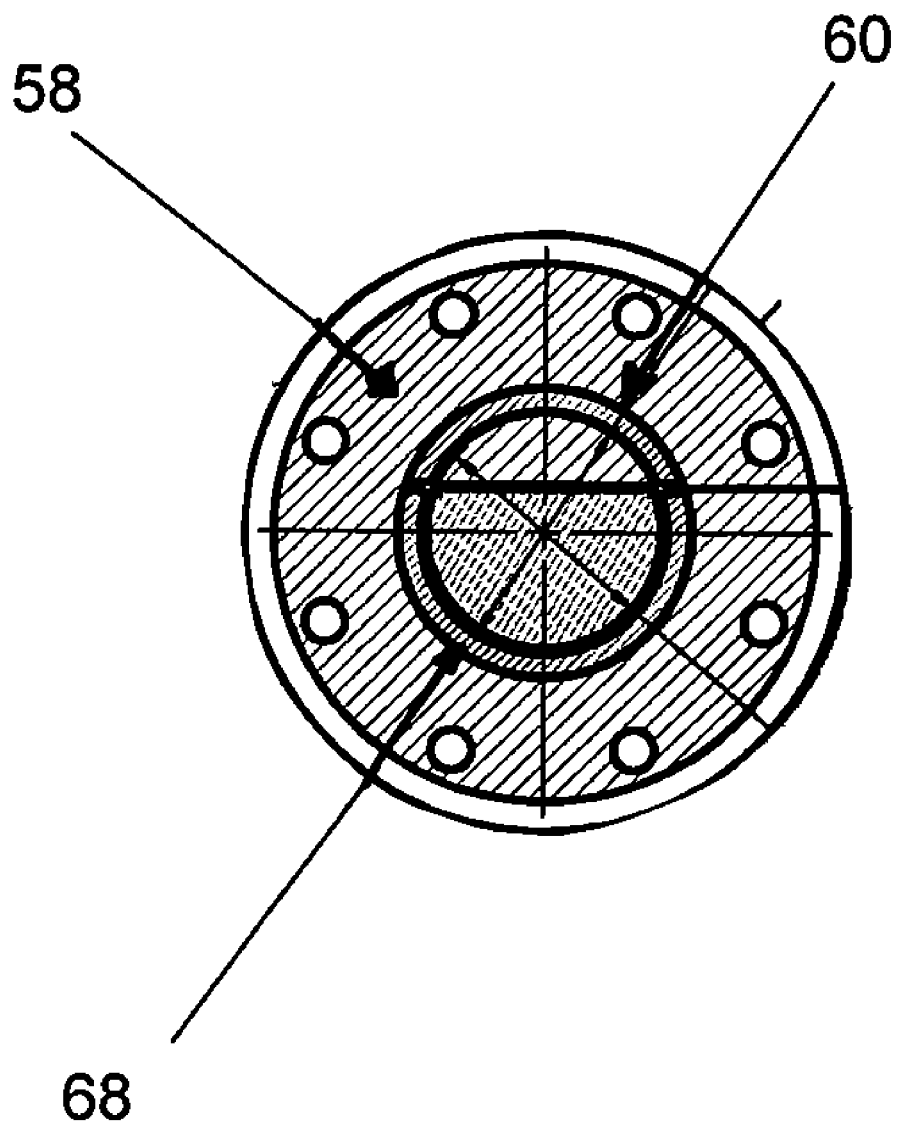
FIG. 11 is a cross sectional view taken along like B-B in FIG. 10.

FIG. 8 illustrates the front view of the alternative embodiment of the present invention in the closed position. The disk 58 and stop(s) 68, 69 are disposed circumferentially inside the flanged ring 60. The stop(s) 68, 69 is disposed such that the disk 58 is maintained in a position that substantially seals the inlet of the flanged ring 60 and prevents refrigerant from flowing into the compressor. Referring now to FIGS. 9 and 10 that are views along lines A-A and D-D from FIG. 8, respectively, the location of the strainer can be seen in relation to the other elements of the alternative embodiment of the present invention. While the strainer is shown in a cylindrical shape, it is to be understood that any suitable shape is acceptable for the strainer. Referring now to FIG. 11, a cross sectional view of line B-B from FIG. 10 illustrates the rear view of the disk 58 and flanged ring 60. The disk 58 is in the second position, where refrigerant is prevented from flowing freely into the strainer and the compressor.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An anti-backflow system for a compressor comprising:
a hollow, cylindrical body;
a flanged ring connected to an end of the cylindrical body, the flanged ring extending from the cylindrical body;
a conical portion having a plurality of openings and being configured with a larger diameter end and a smaller diameter end, the smaller diameter end of the conical portion being adjacent to the end of the cylindrical body having the flanged ring, the larger diameter end of the conical portion being attached to the cylindrical body adjacent to an end of the cylindrical body opposite the flanged ring;
a slide stem secured to the smaller diameter end of the conical portion and extending from the smaller diameter end of the conical portion toward the larger diameter end of the conical portion;
a conical poppet being mounted on the slide stem, the conical poppet being movable between a first position to prevent fluid flow through the cylindrical body and a second position to permit fluid flow through the cylindrical body;
a stop, the stop being configured to limit the conical poppet to movement between the first position and the second position;
a strainer mechanism disposed adjacent the cylindrical body and being configured to trap dirt particles and debris to prevent the dirt particles and debris from passing through the cylindrical body; and
wherein the conical poppet moves along the slide stem between the first position and second position using only fluid flow entering the cylindrical body and the conical poppet is moved into one of the first position or the second position in response to the direction of fluid entering the cylindrical body.

2. The anti-backflow system of claim 1 wherein:
the stop comprising a stop member disposed at an end of the slide stem adjacent the larger diameter end of the conical portion; and
the conical poppet comprises a tube configured to slide along the slide stem, the tube contacting the stop member when the conical poppet is in the second position.

3. The anti-backflow system of claim 2 wherein the plurality of openings in the conical portion are slots configured to maximize flow area through the conical portion and to maintain a structural integrity of the conical portion when the compressor is shut down.

4. The anti-backflow system of claim 2 wherein the strainer mechanism is connected to the conical portion by brazing or soldering.

5. The anti-backflow system of claim 2 wherein the strainer mechanism and the conical portion form an integral unit.

6. The anti-backflow system of claim 1 wherein the strainer mechanism is a steel wire mesh.

7. The anti-backflow system of claim 1 wherein the conical poppet moves to the second position during operation of the compressor and the conical poppet moves to the first position during shut-down of the compressor.

8. A system comprising:
a housing, the housing having an inlet connection and an outlet connection;
a compression device disposed in the housing, the compression device configured to increase a pressure of a fluid flowing between the inlet connection and the outlet connection;
a flow control device disposed adjacent the inlet connection, the flow control device comprising:
a hollow, cylindrical body;
a flanged ring connected to an end of the cylindrical body, the flanged ring extending from the cylindrical body and connected to the inlet connection;
a conical portion having a plurality of openings and being configured with a larger diameter end and a smaller diameter end, the smaller diameter end of the conical portion being adjacent to the end of the cylindrical body having the flanged ring, the larger diameter end of the conical portion being attached to the cylindrical body adjacent to an end of the cylindrical body opposite the flanged ring;
a slide stem secured to the smaller diameter end of the conical portion and extending from the smaller diameter end of the conical portion toward the larger diameter end of the conical portion;
a conical poppet being mounted on the slide stem, the conical poppet being movable between a first position to prevent fluid flow through the cylindrical body and a second position to permit fluid flow through the cylindrical body;
a strainer device disposed adjacent to cylindrical body and being configured to trap dirt particles and debris to prevent the dirt particles and debris from passing through the strainer device; and
wherein the flow control device prevents the backflow of fluid through the housing by having the conical poppet move along the slide stem to the first position using only fluid flow entering the cylindrical body when the compression device is shut down.

9. The system of claim 8 further comprising a stopping arrangement, the stopping arrangement being configured to limit the conical poppet to movement between the first position and the second position.

10. The system of claim 9 wherein:
the stopping arrangement comprises a stop located at an end of the slide stem adjacent the larger diameter end of the conical portion; and
the conical poppet comprises a tube configured to slide along the slide stem, the tube contacting the stop member when the conical poppet is in the second position.

11. The system of claim 10 wherein the plurality of openings in the conical portion are slots configured to maximize flow area and to maintain a structural integrity of the conical portion when the compressor is shut down.

12. The system of claim 10 wherein the strainer device is a steel wire mesh disposed between the conical portion and the poppet.

13. The system of claim 10 wherein the strainer device is connected to the conical portion by brazing or soldering.

14. The system of claim 10 wherein the strainer device and the conical portion form an integral unit.

* * * * *